USO09611904B2

United States Patent
Kataoka et al.

(10) Patent No.: US 9,611,904 B2
(45) Date of Patent: Apr. 4, 2017

(54) CENTRIFUGAL CLUTCH APPARATUS

(75) Inventors: Makoto Kataoka, Hamamatsu (JP);
Masahiro Yamagishi, Hamamatsu (JP);
Naoyuki Miwa, Hamamatsu (JP);
Masataka Murai, Hamamatsu (JP);
Kaoru Aono, Hamamatsu (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 1252 days.

(21) Appl. No.: 13/560,845

(22) Filed: Jul. 27, 2012

(65) Prior Publication Data
US 2013/0020170 A1    Jan. 24, 2013

Related U.S. Application Data

(63) Continuation of application No. PCT/JP2011/051599, filed on Jan. 27, 2011.

(30) Foreign Application Priority Data

Jan. 27, 2010   (JP) .................................. 2010-015839

(51) Int. Cl.
F16D 43/18    (2006.01)
F16D 43/14    (2006.01)

(52) U.S. Cl.
CPC ........ F16D 43/18 (2013.01); *F16D 2043/145* (2013.01)

(58) Field of Classification Search
CPC .... F16D 43/48; F16D 2043/145; F16D 43/14; F16D 43/18
See application file for complete search history.

(56) References Cited

U.S. PATENT DOCUMENTS

| 1,916,126 A | * | 6/1933 | Nardone | .................. | F16D 43/18 |
| | | | | | 192/105 BA |
| 2,370,199 A | * | 2/1945 | Schuckers | ............... | F16D 43/18 |
| | | | | | 192/105 BA |

(Continued)

FOREIGN PATENT DOCUMENTS

| DE | 561468 C | * | 10/1932 | ............. | F16D 43/18 |
| FR | 974033 A | * | 2/1951 | ............. | F16D 43/18 |

(Continued)

OTHER PUBLICATIONS

International Search Report for PCT/JP2011/051599 mailed on Mar. 15, 2011 in two pages.

*Primary Examiner* — Terry Chau
(74) *Attorney, Agent, or Firm* — Knobbe Martens Olson & Bear, LLP (57) ABSTRACT

A centrifugal clutch apparatus can include a driving-side rotational member rotatable around a shaft member connected to a driving device; clutch devices mounted on the driving-side rotational member and movable radially-outward of the driving-side rotational member. A driven-side rotational member rotatable independent from the driving-side rotational member can be arranged for covering the driving-side rotational member and can have an inner circumferential surface to engage with the clutch devices. Friction members can be adapted to be abutted against the inner circumferential surface so as to transmit the driving power of the driving device to the driven-side rotational member. The inner circumferential surface of the driven-side rotational member can be formed with a groove and a tensioning member formed as a ring-shaped member can be snap-fitted into the groove and held therein under a radially-outward biasing force.

4 Claims, 8 Drawing Sheets

(56) References Cited

U.S. PATENT DOCUMENTS

| | | | | |
|---|---|---|---|---|
| 3,055,476 | A * | 9/1962 | Flora | F16D 13/08 192/104 B |
| 3,680,674 | A * | 8/1972 | Horstman | F16D 43/18 192/103 B |
| 6,786,293 | B2 * | 9/2004 | Handa | B60K 23/08 180/247 |
| 2005/0178637 | A1 * | 8/2005 | Tsuchiya | F16D 43/18 192/105 CD |

FOREIGN PATENT DOCUMENTS

| | | | | |
|---|---|---|---|---|
| JP | 59-037440 | | 2/1984 | |
| JP | 09-236140 | | 9/1997 | |
| JP | 2004-036806 | | 2/2004 | |
| JP | EP 2383484 A2 * | 11/2011 | | F16D 43/18 |
| WO | WO 2011/093379 A1 | 8/2011 | | |

* cited by examiner

CENTRIFUGAL CLUTCH APPARATUS

CROSS-REFERENCE TO RELATED APPLICATIONS

This is a continuation of PCT Application No. PCT/JP2011/051599, filed on Jan. 27, 2011, which claims priority to Japanese Patent Application No. 2010-015839,filed on Jan. 27, 2010. The foregoing applications are hereby incorporated by reference herein in their entirety.

BACKGROUND OF THE DISCLOSURE

Field of the Disclosure

The present inventions relates to centrifugal clutch apparatuses for transmitting and cutting off the driving power of a driving device (e.g., engine of a motorcycle) to a driven device (e.g., a transmission of a motorcycle). Some of the embodiments disclosed herein are configured to connect and/or disconnect a driving-side rotational member to an inner circumferential surface of a driven-side rotational member via friction members.

Description of the Related Art

Clutch apparatuses are usually arranged in a power transmission train for transmitting the driving power of an engine of vehicle (e.g., engines of motorcycles scooters) to a driving wheel. Some vehicles use a centrifugal clutch apparatus, which operates using centrifugal force, as a main clutch apparatus. Such centrifugal clutches typically comprise, as disclosed in Japanese Laid-open Patent Publication No. 36806/2004, a driving plate connected to a crank shaft of an engine, clutch devices (clutch shoes) swingably mounted on the driving plate, and a housing having an inner circumferential surface against which the clutch shoes can abut via friction members (facings) when the clutch shoes are swung by the centrifugal force.

The driving power of an engine can thus be transmitted to an output shaft when the friction members abut against the inner circumferential surface of the housing due to swing motions of the clutch devices (clutch shoes) when the rotation of the driving plate exceeds a predetermined speed. Each surface of the clutch devices (clutch shoes) opposing the inner circumferential surface of the housing is formed having a circular arc configuration with a friction member secured on the circular arc surface.

In some centrifugal clutch apparatuses, a noise referred to as "clutch squeal" is sometimes caused during a process in which the clutch devices contact the inner circumferential surface of the housing and slide thereon via the friction members (i.e., a period of time between when the friction members contact the inner circumferential surface of the housing and when the housing increases its rotational speed match the rotational speed of the driving plate). To suppress generation of the "clutch squeal", Japanese Laid-open Patent Publication No. 236140/1997 suggests a centrifugal clutch apparatus in which a vibration isolating ring is crimped around the outer circumferential surface of a housing.

SUMMARY OF THE DISCLOSURE

Because the centrifugal clutch apparatus of the prior art noted above requires a press-formed vibration isolating ring having a complicated configuration, the manufacturing cost can be very high. In addition, there is the risk that a vibration isolating ring mounted on the outer circumferential surface of the driving plate would slip off from the driving plate due to the centrifugal force on the isolating ring. This risk of slippage requires a process for tightly and rigidly crimping the vibration isolating ring onto the driving plate so as to counter the centrifugal force. This method of crimping can also increase the manufacturing cost.

An aspect of at least one of the inventions disclosed herein includes the realization that centrifugal clutch apparatuses can be constructed more simply and with reduced cost while also suppressing generation of the "clutch squeal", for example, by using a vibration reducing member in contact with an inner surface of a portion of the centrifugal clutch.

Thus, in accordance with an embodiment, a centrifugal clutch apparatus can comprise a driving-side rotational member rotatably mounted around a shaft member connected to a driving device and one or more clutch devices mounted on the driving-side rotational member and movable radially outward of the driving-side rotational member when a centrifugal force is exerted on the clutch devices. In some embodiments, the centrifugal clutch apparatus includes a driven-side rotational member rotatable independent of the driving-side rotational member and configured to cover the driving-side rotational member, the driven-side rotational member having an inner circumferential surface configured to be engage with the one or more clutch devices when the one or more clutch devices are moved radially outward. Furthermore, the centrifugal clutch apparatus can include one or more friction members secured on surfaces of the one or more clutch devices opposed to the inner circumferential surface of the driven-side rotational member, the one or more friction member configured to abut against the inner circumferential surface so as to transmit a driving power of the driving device to the driven-side rotational member when the one or more clutch devices are moved due to the centrifugal force. The inner circumferential surface of the driven-side rotational member can a groove and the centrifugal clutch apparatus further can further include a tensioning member having a ring-shaped member configured to snap-fit into the groove and configured to be held therein by a radially-outward biasing force created by the tensioning member.

In some embodiments, the tensioning member comprises an annular member having a cut-off portion in part thereon, the tensioning member configured to be snap-fitted into the groove by reducing a diameter of the annular member at the cut-off portion. The tensioning member can be further configured to be held in the groove by a radially-outward biasing force created by a spring-back elasticity of the tensioning member.

In some embodiments, the tensioning member comprises an annular member having a cut-off portion in part thereon, the cut-off portion defining two ends of the annular member, one end of the cut-off portion being axially staggered from the other end of the cut-off portion. The annular member can be configured to be snap-fitted into the groove by reducing a diameter of the annular member at the cut-off portion, the tensioning member configured to be held in the groove by a radially-outward biasing force created by the spring-back elasticity of the annular member.

In some configurations, the tensioning member comprises an annular member having a cut-off portion in part thereon, the cut-off portion defining two ends of the annular member, one end of the cut-off portion being axially staggered from the other end of the cut-off portion. The annular member can be configured to be snap-fitted into the groove by reducing a diameter of the annular member at the cut-off portion, the tensioning member configured to be held in the groove by a radially-outward biasing force created by the spring-back elasticity of the annular member and by an axially-expanding force created by the spring-back elasticity of the annular member.

In some embodiments, the tensioning member contacts two axially-facing surfaces of the groove when the tensioning member is snap-fitted into the groove.

According to some variations, the tensioning member comprises a substantially-annular member having a plurality of bent portions bent alternately in an axial direction of the tensioning member, the tensioning member configured to be snap-fitted into the groove by reducing a diameter of the annular member. The tensioning member can be configured to be held in the groove by a radially-outward bias created by the spring-back elasticity of the annular member and by the bent portions being contacted by walls of the groove.

In some embodiments, the tensioning member comprises a substantially-annular member configured to be snap-fitted into the groove by reducing a diameter of the annular member. The tensioning member can be configured to be held in the groove by a radially-outward bias created by the spring-back elasticity of the annular member and by an axially-expanding force created by the spring-back elasticity of the annular member.

In some embodiments, the tensioning member contacts two axially-facing surfaces of the groove at a plurality of locations along a circumferential length of the groove.

In some embodiments, a centrifugal clutch apparatus can comprising a driving-side rotational member rotatably mounted around a shaft member connected to a driving device. Furthermore, the centrifugal clutch apparatus can comprise one or more clutch devices mounted on the driving-side rotational member and movable radially outward of the driving-side rotational member when a centrifugal force is exerted on the clutch devices. In some embodiments, the centrifugal clutch apparatus comprises a driven-side rotational member rotatable independent of the driving-side rotational member and configured to cover the driving-side rotational member, the driven-side rotational member having an inner circumferential surface configured to be engage with the one or more clutch devices when the one or more clutch devices are moved radially outward. One or more friction members can be secured on surfaces of the one or more clutch devices opposed to the inner circumferential surface of the driven-side rotational member, the one or more friction member configured to abut against the inner circumferential surface so as to transmit a driving power of the driving device to the driven-side rotational member when the one or more clutch devices are moved due to the centrifugal force. In some embodiments, the centrifugal clutch apparatus comprises a means for reducing vibration, the means for reducing vibration configured to engage with the inner circumferential surface of the driven-side rotational member. The inner circumferential surface of the driven-side rotational member can comprise a groove.

According to some embodiments, a centrifugal clutch apparatus can comprise a driving-side rotational member rotatable around a shaft member connected to a driving device. Clutch devices can be mounted on the driving-side rotational member and movable radially outward of the driving-side rotational member when a centrifugal force is exerted on the clutch devices. A driven-side rotational member can be rotatably independent from the driving-side rotational member and can be arranged for covering the driving-side rotational member, the driven-side rotational member, in some embodiments, having an inner circumferential surface configured to engage with the clutch devices moved radially outward. Friction members can be secured on surfaces of the clutch devices opposed to the inner circumferential surface of the driven-side rotational member. The friction members can be adapted to abut the inner circumferential surface of the driven-side rotational member so as to transmit the driving power of the driving device to the driven-side rotational member when the clutch devices are moved radially outward due to the centrifugal force. The inner circumferential surface of the driven-side rotational member can be formed with a groove. Furthermore, the centrifugal clutch apparatus further can include a tensioning member formed as a ring-shaped member able to be snap-fitted into the groove and held therein in a radially outward-biased condition. In such an embodiment, it can be possible to suppress generation of "clutch squeal" with a simple friction member structure and thus reduce manufacturing costs associated with reducing "clutch squeal."

In some embodiments, the tensioning member is formed as an annular member having a cut-off portion in a part thereon and adapted to be snap-fitted into the groove by reducing its diameter at the cut-off portion, the tensioning member being held in the groove in a radially-outward biased condition exerted by its own spring-back elasticity. In such an embodiment, it can be possible to firmly mount the tensioning member within the groove and thus suppress generation of "clutch squeal."

In some embodiments, the tensioning member is formed as an annular member having a cut-off portion in part thereon with one end of the cut-off portion being axially staggered from the other end of the cut-off portion. The tensioning member can be adapted to be snap-fitted into the groove by reducing its diameter. In some embodiments, the tensioning member is further configured to be held in the groove in a radially-outward biased condition and an axially-expanding biased condition exerted at the cut-off portion by its own spring-back elasticity. In such an embodiment, it is possible to firmly mount the tensioning member within the groove and thus suppress generation of "clutch squeal."

In some embodiments, the tensioning member is formed as a substantially-annular member having a plurality of bent portions bent alternately in its axial direction and adapted to be snap-fitted into the groove by reducing the diameter of the tensioning member. The tensioning member can be configured to be held in the groove in a radially-outward biased condition exerted by its own spring-back elasticity and by the bent portions being contacted with walls of the groove. In such an embodiment, it is possible to urge and abut the tensioning member against the groove at multiple portions (e.g., at the axially projected portions at the bent portions of the tensioning member) and thus to efficiently suppress generation of "clutch squeal."

BRIEF DESCRIPTION OF THE DRAWINGS

These and other features, aspects and advantages are described below with reference to the drawings, which are intended to illustrate but not to limit the disclosure. In the drawings, like reference characters denote corresponding features consistently throughout similar embodiments.

FIG. 4(a) is a cross-sectional view taken along plane a-a of FIG. 3, FIG. 4(b) is a cross-sectional view taken along plane b-b of FIG. 3 and FIG. 4(c) is a cross-sectional view taken along plane c-c of FIG. 3.

FIG. 8 is an external view of an embodiment of a tensioning member in which FIG. 8(a) is a plan view of the tensioning member and FIG. 8(b) is a front elevation view of the tensioning member.

FIG. 10 is a partial cross-sectional view of a centrifugal clutch apparatus in which FIG. 10(a) is a cross-sectional view taken along plane d-d of FIG. 9 and FIG. 10(b) is a cross-sectional view taken along plane e-e of FIG. 9.

DETAILED DESCRIPTION OF THE PREFERRED EMBODIMENTS

Several embodiments of the present disclosure are described below with reference to accompanied figures.

Figure 1:
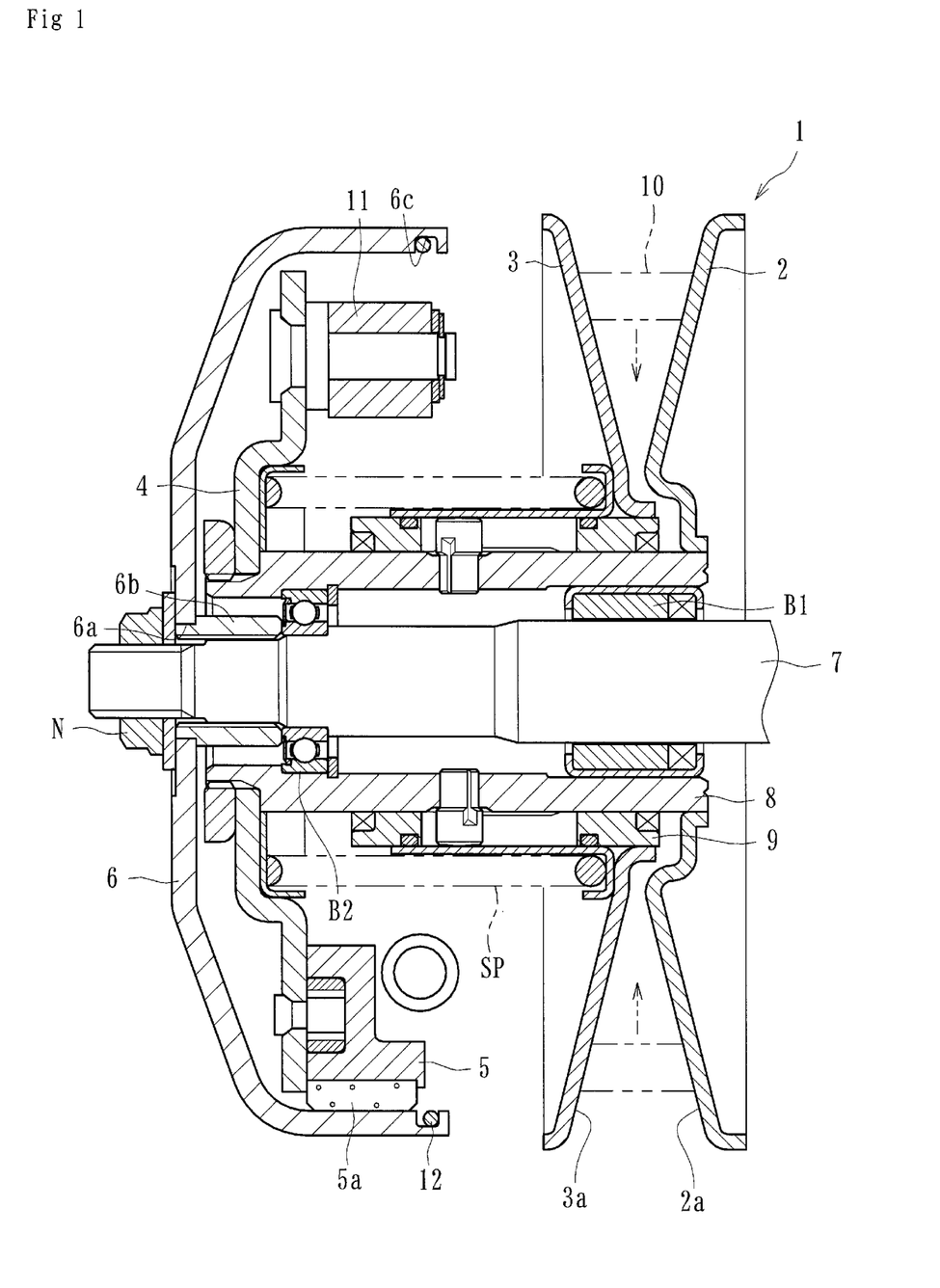
FIG. 1 is a longitudinal cross-sectional view of a centrifugal clutch apparatus in accordance with a first embodiment.

At least one of the embodiments of centrifugal clutch apparatuses disclosed herein can be applied to a centrifugal clutch apparatus of a motorcycle (e.g., a scooter) for transmitting and cutting off the driving power of the engine of the motorcycle to the wheels or other portions of the motorcycle. The centrifugal clutch can comprise, as shown in FIG. 1, a driven pulley 1, a driving plate (driving-side rotational member) 4, clutch devices 5, an output housing (driven-side rotational member) 6, friction members 5a, and a tensioning member 12.

The driven pulley 1 can be driven by a V belt 10 (endless belt) which can be made of plastic resin or other materials. The V belt 10 can be driven by a driving pulley (not shown) rotated by an engine (driving device) of a motorcycle. The driven pulley 1 can comprise an axially immovable sheave 2 and an axially movable sheave 3 formed of, for example, pressed metal. Tapered surfaces (immovable tapered surface 2a and movable tapered surface 3a) for supporting the V belt 10 are oppositely formed between the immovable sheave 2 and the movable sheave 3.

The immovable sheave 2 can be secured to a cylindrical shaft member 8 at its center and the shaft member 8 is rotatably supported on a shaft 7 via a needle bearing B1 and a ball bearing B2. In some embodiments, the movable sheave 3 is mounted on the shaft member 8 via a spline engagement so that the movable sheave 3 is rotatable together with the shaft member 8 and with the immovable sheave 2, the movable sheave 3 is also axially movable toward and away from the immovable sheave 2.

The movable sheave 3 can be urged toward the immovable sheave 2 by a spring SP (e.g., in a direction in which the movable tapered surface 3a approaches the immovable tapered surface 2a) and moved toward a direction (the left-hand direction in FIG. 1) away from the immovable sheave 2 against the urging force of the spring SP when the rotational radius of the V belt 10 around the driven pulley 1 is reduced. During this operation, a shaft member 9 of the movable sheave 3 can slide on the shaft member 8 of the immovable sheave 2 along the spline engagement formed between the shaft members 8, 9.

The centrifugal clutch can be configured such that the rotational radius of the V belt 10 around the driving pulley is increased when the engine speed is increased, which can cause the V belt 10 in the driven pulley 1 to be moved radially inward as shown by arrows in FIG. 1. In such instances, the movable sheave 3 is moved toward the left-hand direction in FIG. 1 (e.g., a direction in which the rotational radius of the V belt around the driven pulley 1 is reduced) and a shift-up operation can be achieved. Accordingly, the shift change operation can be automatically achieved by the centrifugal clutch apparatus.

The driving plate 4 can function as a driving-side rotational member and can be rotatable together with the shaft member 8 connected to the engine (driving device). The driving plate can be further rotatable together with the immovable sheave 2 of the driven pulley 1 secured on the shaft member 8. A plurality of clutch devices 5 and weights 11 can be mounted on the outer circumference of the driving plate 4. The clutch devices 5 can be swung radially outward of the driving plate 4 when the rotational speed is increased to that exceeding a predetermined value.

The output housing (driven-side rotational member) 6 is rotatable independently from the driving plate 4 and can have a covering portion for covering the clutch devices 5 and weights 11 mounted on the driving plate 4, the covering portion having an inner circumferential surface arranged opposite to the clutch devices 5 so that it can be abutted by swung clutch devices 5. In some embodiments, the output housing 6 has a substantial configuration like an "umbrella" for covering the outer periphery of the driving plate 4 and has an aperture 6a in which the tip end of the shaft 7 is inserted. In addition, a cylindrical member 6b extending toward the driven pulley 1 can be integrally secured (e.g., by welding) in the aperture 6a and a spline can be formed on the inner circumference of the cylindrical member 6a for engaging a spline formed on the outer circumference of the shaft 7.

A friction member 5a can be secured on a surface of each of the clutch devices 5 opposing the inner circumferential surface of the output housing (driven-side rotational member) 6. The friction members 5a can be configured to abut against the inner circumferential surface when the clutch devices 5 is swung radially outward, thereby transmitting the driving power of an engine to the output housing (driven-side rotational member) 6. That is, the friction member 5a of each clutch devices 5 is abutted against the inner circumferential surface of the output housing 6 in order to rotate it together with the driving plate 4 when the rotational speed of the driven pulley 1 is increased over a predetermined value and the clutch devices 5 are swung radially outward. The predetermined value can be any speed. In some embodiments, the predetermined speed can be an idle speed of the engine. Thus, when the engine is at an idle speed, the clutch devices 5 do not swing out with significant force. On the other hand, when the engine speed rises above idle speed, the clutch devices 5 swing out under centrifugal force, thereby pressing the friction members 5b against the inner circumferential surface of the output housing 6 with greater force and thus greater friction.

The output housing 6 can be secured to the tip end of the shaft 7 by a fastening nut N. The base end of the shaft 7 can be connected to a transmission formed by reduction gears to drive a rear wheel of a vehicle, such as a motorcycle or scooter. For example, the clutch members 5 are abutted against the output housing 6 via the friction members 5a by centrifugal force when the rotational speed of the driven pulley 1 exceeds a predetermined speed, and accordingly the driving power from an engine can be transmitted to the rear wheel through the driven pulley 1, driving plate 4, output housing 6, shaft 7, and transmission.

Figure 2:
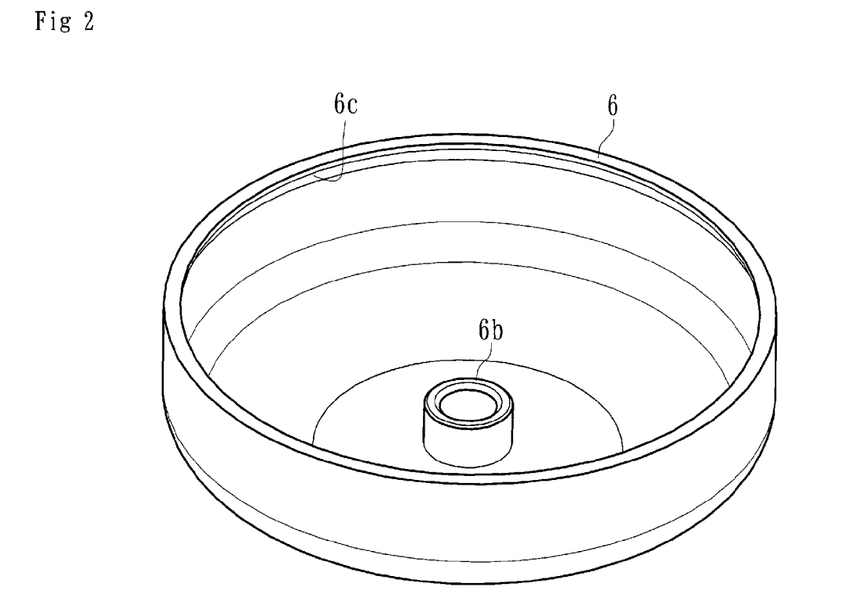
FIG. 2 is a perspective view of the driven-side rotational member of the centrifugal clutch apparatus.

According to some embodiments, a groove 6c can be formed on the inner circumferential surface of the output housing (driven-side rotational member) 6 at a position nearer to the opened end of the output housing 6 than to the abutting position of the friction member 5a. A tensioning member 12 can be snap-fitted into the groove 6c as shown in FIG. 1. The groove 6c can be formed along the inner circumferential surface of the output housing 6 (see, e.g., FIG. 2) with a rectangular cross-section and a width greater than the thickness of the tensioning member 12 so as to accommodate snap-fitting of the tensioning member 12 (see, e.g., FIGS. 1 and 4).

Figure 5:
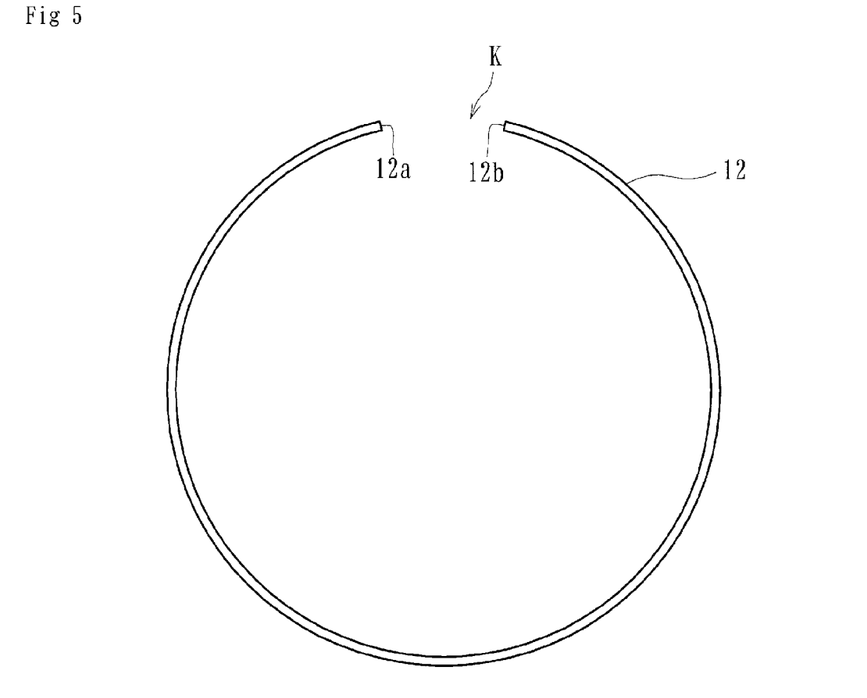
FIG. 5 is a plan view of an embodiment of a tensioning member.
Figure 6:
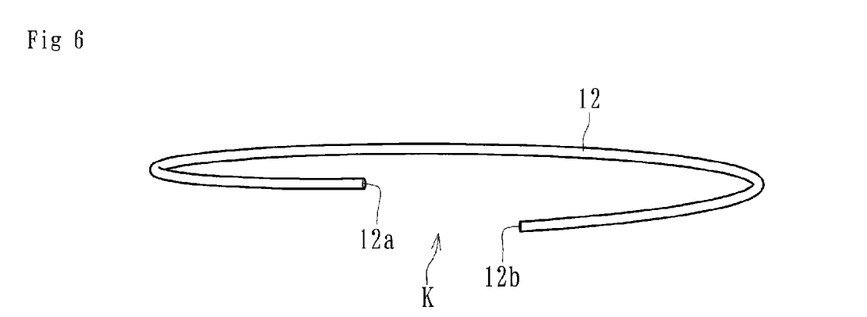
FIG. 6 is a perspective view of the tensioning member of FIG. 5.

As shown in FIGS. 5 and 6, the tensioning member 12 can be formed as a ring-shaped member (annular member of metallic linear material) configured to be snap-fitted into the groove 6c and held therein by a radially-outward bias created by the spring-back elasticity of the tensioning member 12. For example, the outer diameter of the tensioning member 12 is set slightly larger than the diameter of the groove 6c and thus the tensioning member 12 gets is biased radially-outward (i.e., tensioned condition) when it is snap-fitted into the groove 6c.

Further, as shown in FIGS. 5 and 6, the tensioning member 12 can be formed as an annular member having a cut-off portion K in part thereon (the cut-off portion K being formed by ends 12a, 12b) and can be adapted to be snap-fitted into the groove 6c, its diameter reduced such that the tensioning member is held in the groove 6c by a radially-outward bias created by its own spring-back elasticity.

Figure 3:
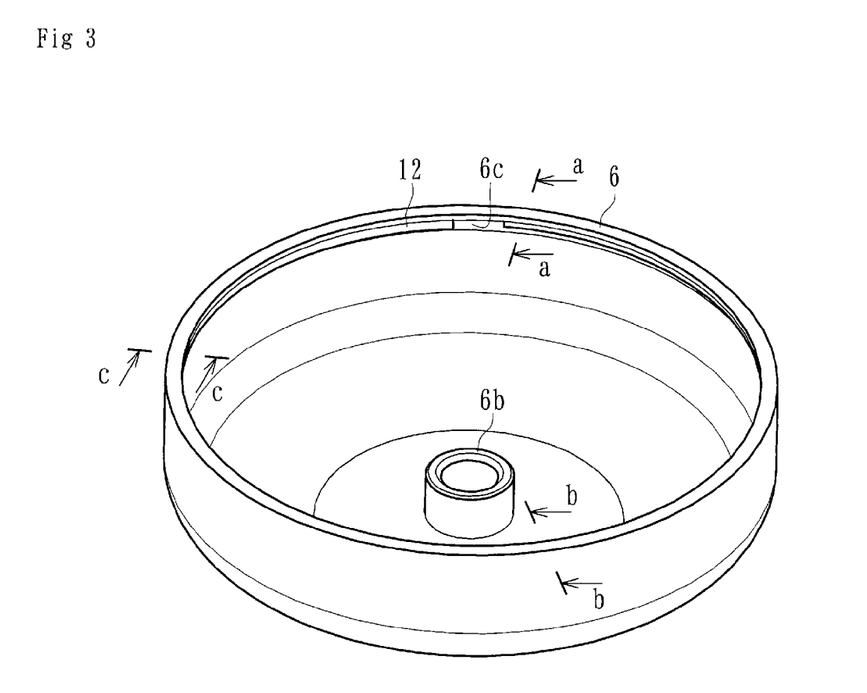
FIG. 3 is a perspective view of the driven-side rotational member of the centrifugal clutch apparatus of FIG. 1 to which a tensioning member is mounted.
Figure 4:
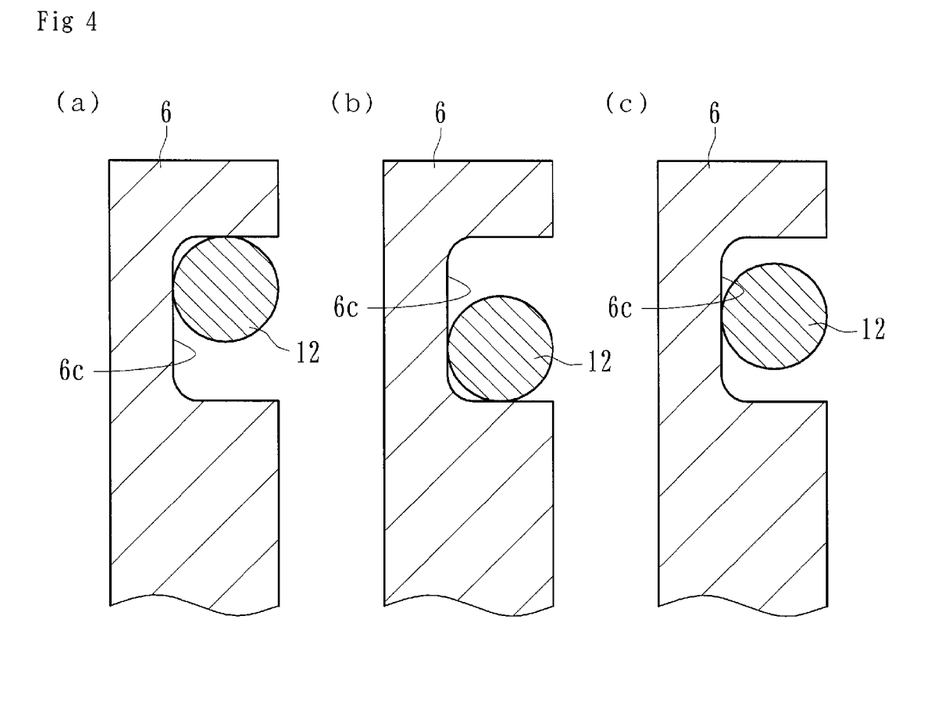
FIG. 4 is a partial cross-sectional of a groove of the centrifugal clutch apparatus of FIG. 1 within which a tensioning member is mounted, where

In addition, as shown in FIG. 6, the tensioning member 12 can be formed as an annular member having a cut-off portion K in part thereon with one end 12a of the cut-off portion K being axially (e.g., the vertical direction in FIG. 6) staggered from the other end 12b of the cut-off portion K. The tensioning member 12 can be configured to be snap-fitted into the groove 6c while reducing its diameter at the cut-off portion K and to be held in the groove 6c by a radially-outward bias (e.g., left-hand and right-hand direction in FIG. 6) created by its own spring-back elasticity. Thus, as shown in FIG. 3, the tensioning member 12 can be mounted within the groove 6c so that it is held in the groove 6c by a radially-outward bias, thereby pressing the tensioning member 12 against the central, radially-facing surface of the groove 6c and by an axial bias created by its own spring-back elasticity thereby pressing the tensioning member 12 against the other, axially-facing surfaces of the groove 6c. This effect is shown in FIG. 4 in which FIG. 4(a) is a cross-sectional view taken along a line a-a of FIG. 3, FIG. 4(b) is a cross-sectional view taken along a line b-b of FIG. 3, and FIG. 4(c) is a cross-sectional view taken along a line c-c of FIG. 3.

As described above, since the tensioning member 12 is held within the groove 6c formed on the inner circumferential surface of the output housing (driven-side rotational member) 6 with a radially-outward bias and an axial bias, it is possible to suppress the "clutch squeal" by a simple structure and thus reduce the manufacturing cost of the centrifugal clutch apparatus. In particular, since the tensioning member 12 is mounted on the inner circumferential surface of the output housing 6, the centrifugal force caused by rotation of the output housing 6 acts to further hold the tensioning member 12 within the groove 6c, thus making it possible to eliminate any additional securing device of the tensioning member 12 and to further reduce the manufacturing cost of the centrifugal clutch apparatus.

As described above, since the tensioning member 12 is formed with the cut-off portion K and adapted to be snap-fitted into the groove 6c with reducing its diameter at the cut-off portion K, it is possible to firmly mount the tensioning member 12 in the groove 6c with a radially-outward biasing force created by its own spring-back elasticity and thus to further surely suppress generation of the "clutch squeal". In addition, since the cut-off portion K has one end 12a axially staggered from the other end 12b of the cut-off portion K, the tensioning member 12 can be snap-fitted into the groove 6c by reducing its diameter at the cut-off portion K and can be further held within the groove 6c by the axial biasing force created by the spring-back elasticity of the tensioning member 12. Accordingly, it is possible to further firmly hold the tensioning member 12 in the groove 6c and thus to suppress generation of the "clutch squeal".

Figure 7:
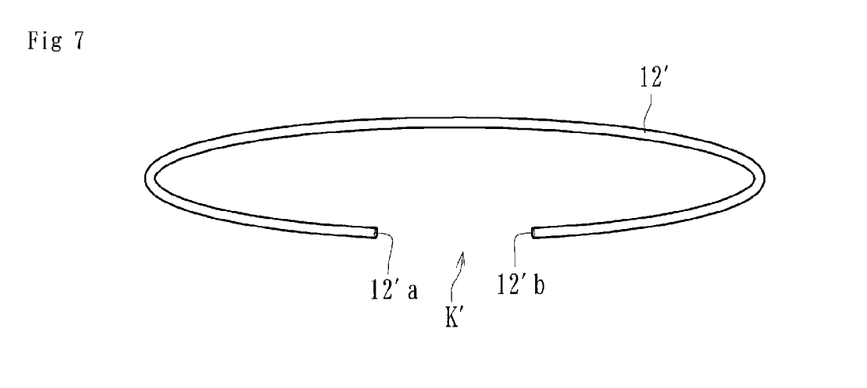
FIG. 7 is a perspective view of another embodiment of a tensioning member.

It is possible to use a modified tensioning member 12' shown in FIG. 7 in place of the tensioning member 12. The tensioning member 12' can be formed with a cut-off portion K' in which one end 12'a of the cut-off portion K' is not axially staggered from the other end 12'b (e.g., both ends 12'a, 12'b are in coplanar). Of course, such a tensioning member 12' can be snap-fitted into the groove 6c by reducing its diameter and firmly mounted in the groove 6c with a radially-outward biasing force created by its own spring-back elasticity.

In some additional embodiments, the centrifugal clutch apparatus of the present disclosure can be applied to a motorcycle such as a scooter for performing transmission and cutting off of a driving power of an engine of a motorcycle to the wheels or other portions of the motorcycle. In some additional embodiments, a tensioning member 13 can be used in place of the tensioning member 12 of the first embodiment, along with other main components such as driven pulley 1, driving plate (driving-side rotational member) 4, clutch devices 5, output housing (driven-side rotational member) 6, friction member 5a etc. Some of the features of the additional embodiments are the same as those used with the tensioning member 12, thus detailed description of the shared components is omitted.

Figure 8:
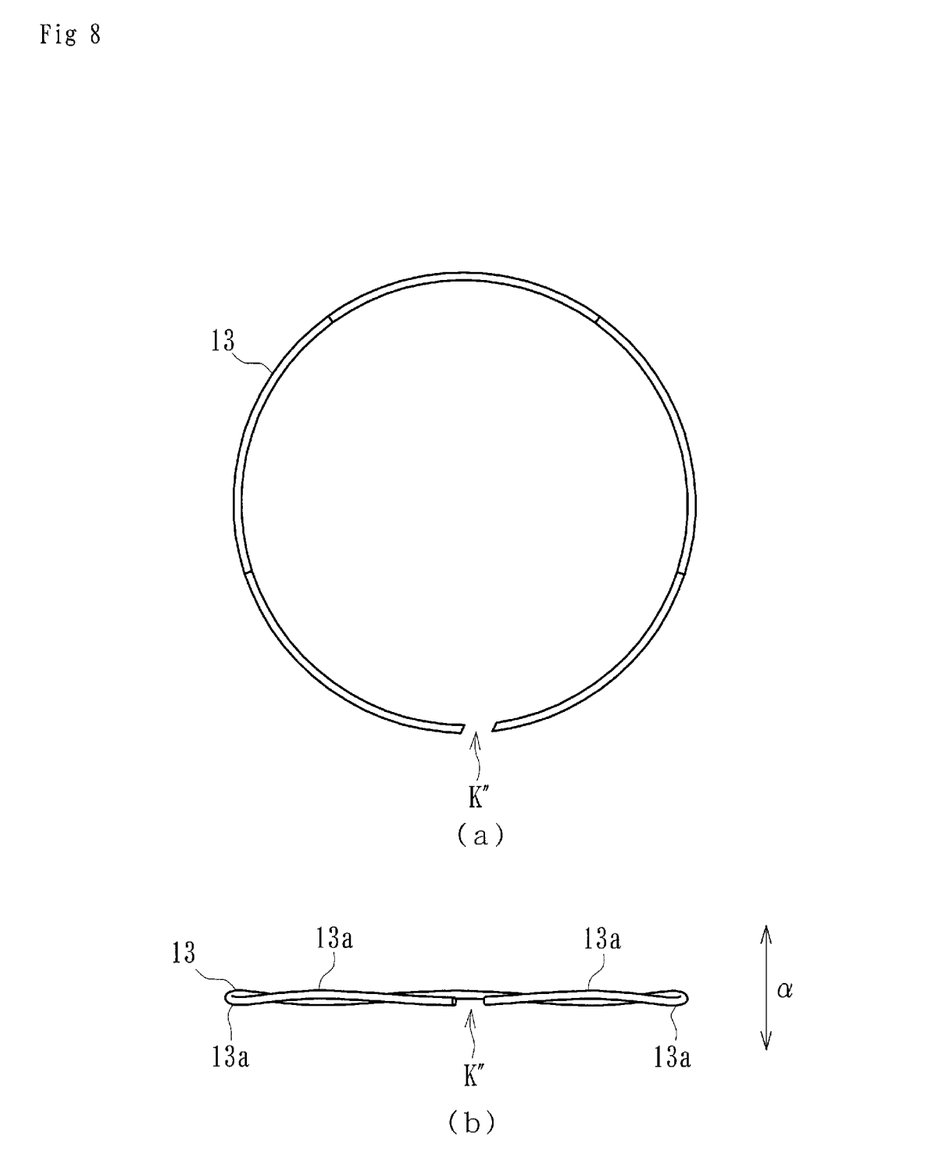

As shown in FIG. 8, the tensioning member 13 can be a substantially-annular member (having a shape in which a cutting-off portion K is provided in part thereon) having a plurality of bent portions 13a bent alternately in the axial direction of the tensioning member 13 (e.g., direction a in FIG. 8(b)), the tensioning member 13 formed as a "corrugated spring" made by pressing a metallic linear member into an annulus having a plurality of axially bent portions of a corrugated configuration.

Figure 9:
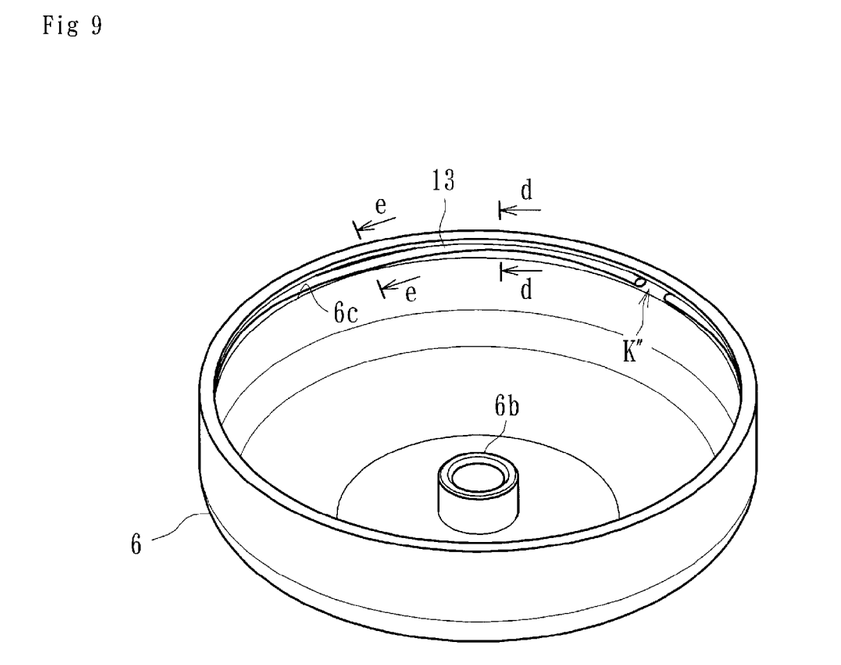
FIG. 9 is a perspective view of a driven-side rotational member of a centrifugal clutch apparatus to which an embodiment of a tensioning member is mounted.

As shown in FIG. 9, the tensioning member 13 can be snap-fitted into the groove 6c of the output housing (driven-side rotational member) 6 by reducing its diameter, the tensioning member 13 held in the groove 6c by outwardly-biased and axially biased forces created by the resilience of the tensioning member, the bent portions 13a contacting the side walls of the groove 6c.

Figure 10:
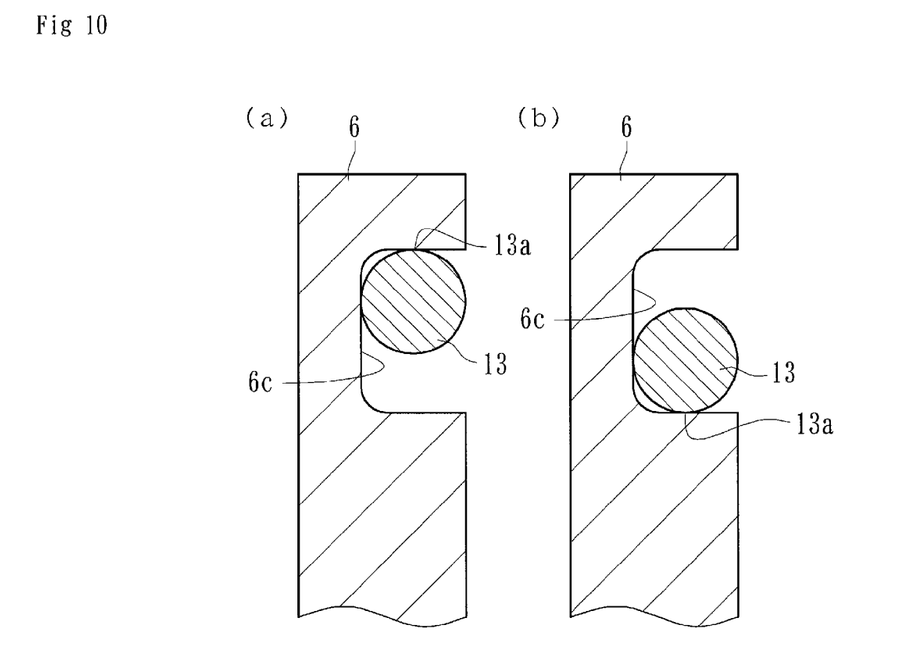

In particular, as shown in FIG. 9, when the tensioning member 13 is mounted in the groove 6c, the top of corrugation of each bent portion 13a can contact the upper-side (i.e., opened end-side) wall surface of the groove 6c by its spring-back elasticity (FIG. 10(a)) and, conversely, the bottom of corrugation of each bent portion 13a can contact the lower-side (i.e., opposite-side to the opened end) wall surface of the groove 6c due to spring-back elasticity of the tensioning member 13 (see, e.g., FIG. 10(b)). That is, according to this embodiment, since the tensioning member 13 has a plurality of bent portions 13a, it can contact to the groove 6c at positions of the bent portions 13a.

According to some embodiments of the centrifugal clutch apparatus, because the tensioning member 13 is formed with a substantially-annular member having a plurality of bent portions 13a bent alternately in its axial direction, and because the tensioning member 13 can be snap-fitted into the groove 6c by reducing its diameter and held in the groove 6c by a radially-outward biasing force created by its own spring-back elasticity with the plurality of bent portions 13a contacting with walls of the groove 6c, the tensioning member 13 can be contacted with the groove 6c at many points and thus more efficiently suppress generation of the "clutch squeal".

In view of efficient suppression of generation of the "clutch squeal", it is preferable to form as many bent portions 13a as possible. In addition, although the tensioning member 13 shown in FIG. 8 is formed with a cut-off portion K", it is possible to form the tensioning member 13 of according to a "corrugated spring" configuration without the cut-off portion K".

Figure 11:
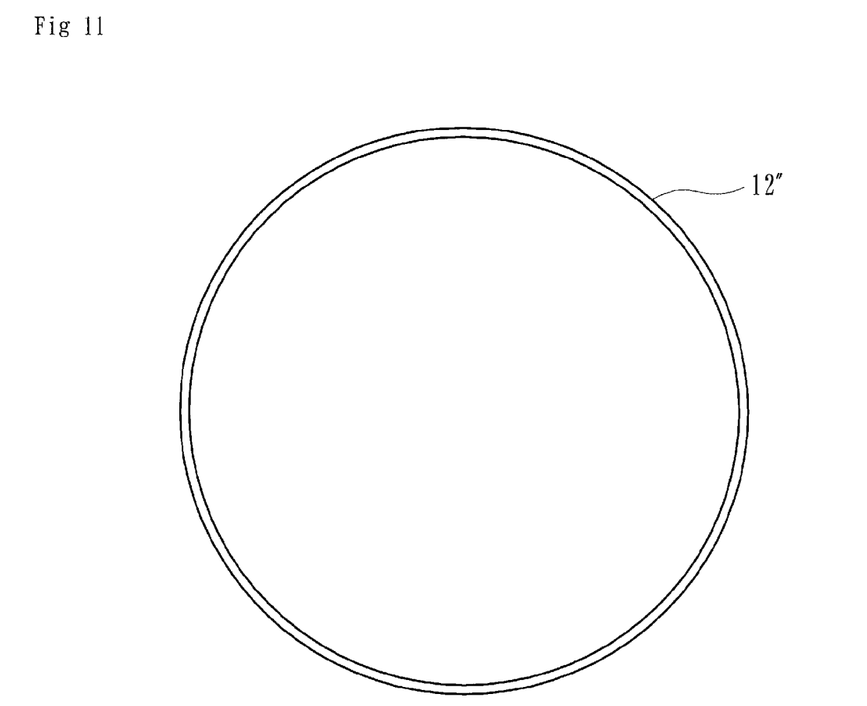
FIG. 11 is a plan view showing another embodiment of a tensioning member.

The centrifugal clutch apparatus of the present disclosure has been described with reference to the preferred embodiments. However the present disclosure is not limited to these embodiments. For example, the tensioning member is not limited to that made of metal and any material can be applied to the tensioning member if it comprises a ring-shaped member able to be snap-fitted into the groove 6c and held therein by a radially-outward biasing force created by its own spring-back elasticity. In addition, it is possible to use a tensioning member 12" such as shown in FIG. 11 not having any cut-off portion if it is held in the groove 6c by a radially-outward biasing force created by its own spring-back elasticity.

Figure 12:
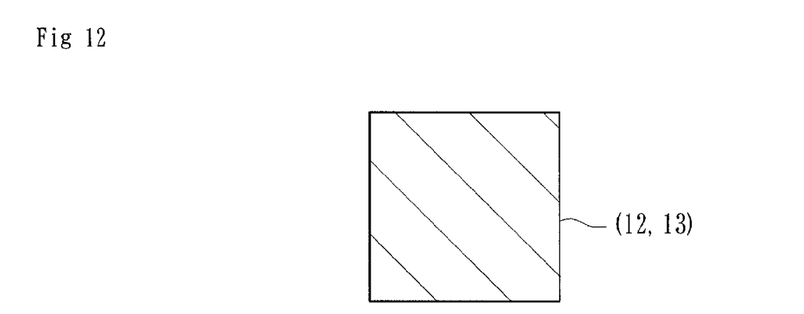
FIG. 12 is a cross-sectional view of an embodiment of a tensioning member having a rectangular cross-section.
Figure 13:
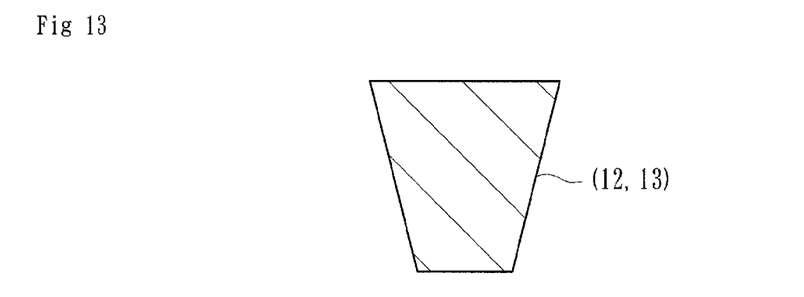
FIG. 13 is a cross-sectional view of an embodiment of a tensioning member having a trapezoidal cross-section.
Figure 14:
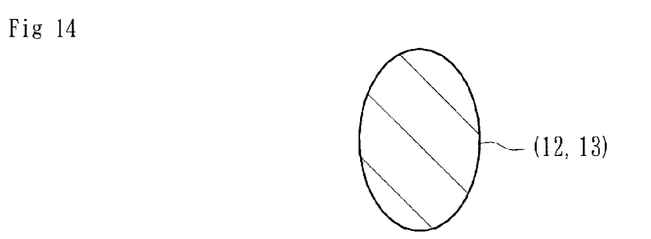
FIG. 14 is a cross-sectional view of an embodiment of a tensioning member having an elliptical cross-section.
Figure 15:
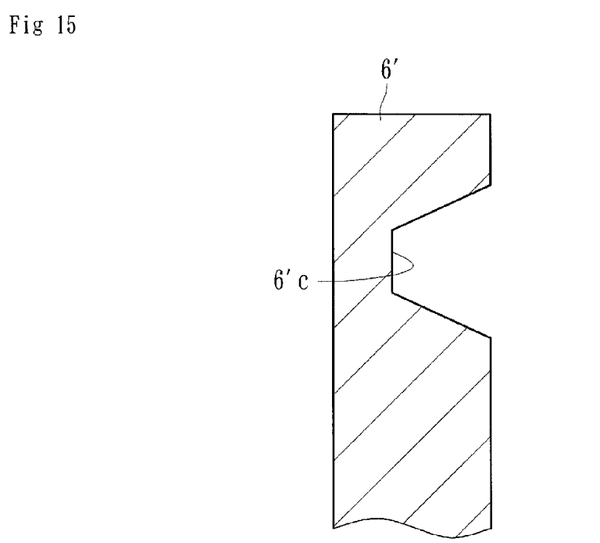
FIG. 15 is a cross-sectional view of an embodiment of a driven-side rotational member having a groove with a trapezoidal cross-section.
Figure 16:
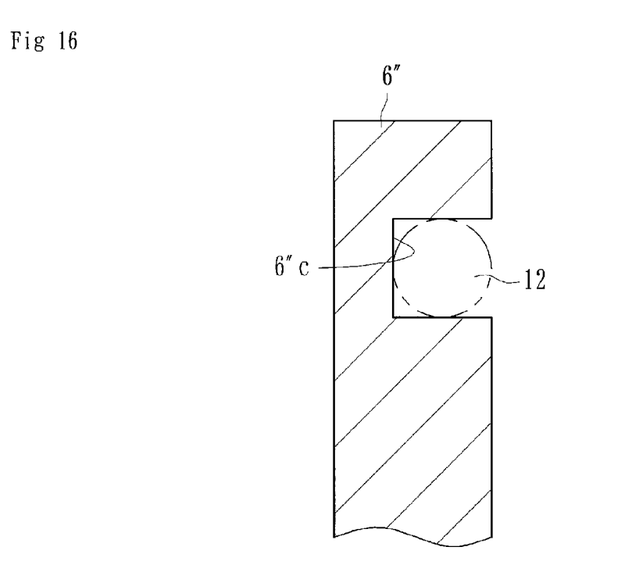
FIG. 16 is a schematic cross-sectional view of an embodiment of a driven-side rotational member having a groove with a narrow width.

Furthermore it is possible to use various kinds of cross-sectional configurations of the tensioning member. For example, a rectangular configuration of FIG. 12, a trapezoidal configuration of FIG. 13, and/or an elliptical configuration of FIG. 14 can be used. In addition, it is possible to use an output housing 6' formed with a groove 6'c of trapezoidal cross-section (i.e., tapered side walls) shown in FIG. 15 and/or an output housing 6" formed with a groove 6"c having a width substantially same as a diameter of the tensioning member 12 shown in FIG. 16 (e.g., a width narrower than those shown in the embodiments).

The present embodiments can be applied to any centrifugal clutch apparatus if the inner circumferential surface of the driven-side rotational member is formed with a groove and the centrifugal clutch apparatus further comprises a tensioning member formed as a ring-shaped member able to be snap-fitted into the groove and held therein by a radially-outward biasing force created by its own spring-back elasticity, even if the centrifugal clutch apparatus has a different external view and/or other additional functions.

What is claimed is:

1. A centrifugal clutch apparatus comprising:
   a driving-side rotational member rotatably mounted around a shaft member connected to a driving device;
   one or more clutch devices mounted on the driving-side rotational member and movable radially outward of the driving-side rotational member when a centrifugal force is exerted on the clutch devices;
   a driven-side rotational member rotatable independent of the driving-side rotational member and configured to cover the driving-side rotational member, the driven-side rotational member having an inner circumferential surface configured to be engage with the one or more clutch devices when the one or more clutch devices are moved radially outward; and
   one or more friction members secured on surfaces of the one or more clutch devices opposed to the inner circumferential surface of the driven-side rotational member, the one or more friction member configured to abut against the inner circumferential surface so as to transmit a driving power of the driving device to the driven-side rotational member when the one or more clutch devices are moved due to the centrifugal force;
   wherein the inner circumferential surface of the driven-side rotational member comprises a groove; and
   the centrifugal clutch apparatus further comprises a tensioning member comprising an annular-shaped member having a plurality of bent portions bent alternately in an axial direction of the tensioning member, the annular-shaped member configured to snap-fit into the groove by reducing a diameter of the annular-shaped member and configured to be held therein by a radially-outward biasing force created by a spring-back elasticity of the tensioning member and by the bent portions being contacted by walls of the groove, the tensioning member configured to reduce vibration of the centrifugal clutch apparatus and positioned within the groove and out of contact from other components of the centrifugal clutch apparatus other than the driven-side rotational member.

2. The centrifugal clutch apparatus of claim 1 wherein the tensioning member comprises the annular-shaped member having a cut-off portion in part thereon and configured to be snap-fitted into the groove by reducing the diameter of the annular-shaped member at the cut-off portion, the tensioning member further configured to be held in the groove by the radially-outward biasing force created by the spring-back elasticity of the tensioning member.

3. The centrifugal clutch apparatus of claim 1, wherein the tensioning member comprises the annular-shaped member configured to be snap-fitted into the groove by reducing the diameter of the annular-shaped member and configured to be held in the groove by the radially-outward bias created by the spring-back elasticity of the annular-shaped member and by an axially-expanding force created by the spring-back elasticity of the annular-shaped member.

4. The centrifugal clutch apparatus of claim 3, wherein the tensioning member contacts two axially-facing surfaces of the groove at a plurality of locations along a circumferential length of the groove.

* * * * *